US009542214B2

(12) United States Patent
Stevens et al.

(10) Patent No.: US 9,542,214 B2
(45) Date of Patent: *Jan. 10, 2017

(54) OPERATING SYSTEM VIRTUALIZATION FOR HOST CHANNEL ADAPTERS

(71) Applicant: GLOBALFOUNDRIES INC., Grand Cayman (KY)

(72) Inventors: Jerry W Stevens, Raleigh, NC (US); Maurice Isrel, Research Triangle Park, NC (US); Constantinos Kassimis, Research Triangle Park, NC (US); Donald William Schmidt, Poughkeepsie, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 73 days.

This patent is subject to a terminal disclaimer.

(21) Appl. No.: 14/503,362

(22) Filed: Sep. 30, 2014

(65) Prior Publication Data

US 2015/0058851 A1 Feb. 26, 2015

Related U.S. Application Data

(63) Continuation of application No. 13/948,146, filed on Jul. 22, 2013, now Pat. No. 9,128,740.

(51) Int. Cl.
*G06F 9/455* (2006.01)

(52) U.S. Cl.
CPC ......... *G06F 9/45545* (2013.01); *G06F 9/4555* (2013.01); *G06F 9/45558* (2013.01); *G06F 2009/45595* (2013.01)

(58) Field of Classification Search
CPC .... G06F 9/45545; G06F 9/4555; G06F 9/455; G06F 9/45558

USPC .......................... 711/153, 6, 154, 203; 718/1
See application file for complete search history.

(56) References Cited

U.S. PATENT DOCUMENTS

| 5,257,379 A | 10/1993 | Cwiakala | |
|---|---|---|---|
| 6,330,615 B1* | 12/2001 | Gioquindo | ........ H04L 29/12009 709/236 |
| 6,330,616 B1* | 12/2001 | Gioquindo | ........ H04L 29/12009 709/236 |

(Continued)

FOREIGN PATENT DOCUMENTS

| CN | 101075198 A | 11/2007 |
|---|---|---|
| CN | 101615106 A | 12/2009 |
| CN | 102447725 A | 5/2012 |

OTHER PUBLICATIONS

Buonadonna, "Queue-Pair IP: A Hybrid Architecture for System Area Networks"; Intel Research Berkeley; Mar. 2002; pp. 1-12.

(Continued)

*Primary Examiner* — Stephen Elmore
(74) *Attorney, Agent, or Firm* — Anthony Canale; Andrew M. Calderon; Roberts Mlotkowski Safran Cole & Calderon P.C.

(57) ABSTRACT

A host information handling system (IHS) provides virtualization of host channel adapters (HCAs). A hypervisor partitions a system memory of the host IHS into multiple logical partitions (LPARs). A particular LPAR includes a single instance of an operating system. The single instance of the operating system includes a common layer that provides virtualization of physical HCAs and sharing of the physical HCAs by multiple virtual HCAs.

7 Claims, 3 Drawing Sheets

(56) References Cited

U.S. PATENT DOCUMENTS

| | | | | |
|---|---|---|---|---|
| 6,334,154 | B1* | 12/2001 | Gioquindo | H04L 29/12009 709/236 |
| 6,654,812 | B2* | 11/2003 | Gioquindo | H04L 29/12009 370/466 |
| 6,681,258 | B1* | 1/2004 | Ratcliff | H04L 29/12009 709/230 |
| 6,778,540 | B1* | 8/2004 | Ratcliff | H04L 12/46 370/389 |
| 7,428,598 | B2* | 9/2008 | Arndt | H04L 12/18 370/389 |
| 7,606,965 | B2* | 10/2009 | Njoku | G06F 13/4022 710/305 |
| 7,873,751 | B2* | 1/2011 | Arndt | H04L 12/18 370/389 |
| 7,940,706 | B2 | 5/2011 | Elko | |
| 7,979,548 | B2* | 7/2011 | Arndt | G06F 9/5077 709/226 |
| 8,036,229 | B2 | 10/2011 | Banerjee | |
| 2006/0095690 | A1* | 5/2006 | Craddock | G06F 12/1475 711/153 |
| 2006/0107000 | A1 | 5/2006 | Jung-Ik | |
| 2006/0282529 | A1 | 12/2006 | Nordin | |
| 2007/0271559 | A1 | 11/2007 | Easton | |
| 2008/0267183 | A1* | 10/2008 | Arndt | H04L 12/18 370/390 |
| 2009/0077268 | A1* | 3/2009 | Craddock | H04L 12/1886 709/250 |
| 2009/0319728 | A1 | 12/2009 | Bakke | |
| 2015/0058851 | A1* | 2/2015 | Stevens | G06F 9/4555 718/1 |

OTHER PUBLICATIONS

Challa, "Comparative Study of Axial Flux Permanent Magnet Brushless DC Motor Operating With the Winding Connected in Single-Phase and Two-Phase System"; A Thesis Submitted to the Graduate Faculty of the Louisiana State University and Agricultural and Mechanical College in the Department of Electrical Engineering; Aug. 2006; pp. 1-8.
Ching, "Link Aggregation"; Thecus Blog; Jan. 14, 2013; pp. 1-5.
Dante, "Get Ready for a New Dimension in Computing."; System z Technical Education; IBM Advanced Technical Skills in Gaithersburg, Maryland; 2011; pp. 1-144.
Deek, The Impact of Channel Bonding on 802.11n Network Management; ACM CoNEXT 2011, Dec. 6-9, 2011, Tokyo, Japan; pp. 1-12.
Feldman, "RoCE: An Ethernet-InfiniBand Love Story"; HPCwire, Apr. 22, 2010; pp. 1-11.
Filliater, "InfiniBand Technology and Usage Update"; Mellanox Technologies; SDC Storage Developer Conference, SNIA, Santa Clara; 2012; pp. 1-48.
Fischer, "Link Aggregation"; ADMIN Network & Security; © 2013 Linux New Media USA, LLC; pp. 1-4.
Fuller, "Sub-microsecond interconnects for processor connectivity—The opportunity"; EDN Networks, May 22, 2013; pp. 1-10.
Guijarro; "Experience and Lessons learnt from running High Availability Databases on Network Attached Storage"; International Conference on Computing in High Energy and Nuclear Physics (CHEP'07); Journal of Physics: Conference Series 119; 2008, IOP Publishing Ltd; pp. 1-10.
Hendel, Link Aggregation Trunking; Sun Microsystems IEEE 802—Tutorial Session Nov. 11, 1997; pp. 1-9.
Intel, "PCI-SIG SR-IOV Primer"; An Introduction to SR-IOV Technology; Jan. 2011; pp. 1-28.
Lowe, "What is SR-IOV?"; The weblog of an IT pro specializing in virtualization, storage, and servers; blog.scottlowe.org; Dec. 2, 2009; pp. 1-5.
MELLANOX1, "RoCE vs. iWARP Competitive Analysis Brief"; WHITEPAPER; © Copyright 2010; Mellanox Technologies; www.mellanox.com; Nov. 2010; pp. 1-3.
MELLANOX2, "InfiniBand Architecture Overview Back to Basic"; www.mellanox.com; © 2009 Mellanox Technologies; pp. 1-38.
MICROSOFT1, Overview of Single Root I/O Virtualization (SR-IOV); © 2013 Microsoft, Build date Jun. 19, 2013; p. 1.
MICROSOFT2, "SR-IOV Architecture"; © 2013 Microsoft. Build date Jun. 19, 2013; pp. 1-3.
MICROSOFT3, "Overview of SR-IOV Data Paths"; © 2013 Microsoft; Build date Jun. 19, 2013; pp. 1-2.
QLOGIC, "NIC Partitioning and SR-IOV"; Technology Brief; 2012; pp. 1-4.
Recio, "RDMA enabled NIC (RNIC) Verbs Overview"; dated Apr. 29, 2003; available from http://www.rdmaconsortium.org/home/RNIC_Verbs_Overview2.pdf, pp. 1-28.
Rouse, "PCI Express (PCIe or PCI-E)"; SearchDataCenter.com; Mar. 28, 2008; p. 1.
Singh, "I/O Configuration Using z/OS HCD and HCM"; ibm.com/redbooks; Apr. 2010; pp. 1-462.
Stevens, "Network Virtualization, Management, and Security"; IBM zEnterprise System; © 2010 IBM Corporation; pp. 1-40.
Torres, "Everything You Need to Know About the PCI Express"; Hardware Secrets; Jul. 12, 2012; pp. 1-8.
Wiki, "RDMA over Converged Ethernet"; From Wikipedia; http://en.wikipedia.org/w/index.php?title=RDMA_over_Converged_Ethernet&oldid=564939508; last modified on Jul. 19, 2013; pp. 1-3.
Woodruff, "Introduction to the InfiniBand Core Software"; Proceedings of the Linux Symposium, vol. Two; Ottawa, Ontario Canada; Jul. 20-23, 2005; pp. 1-14.
ZCOPY, "Quick Concepts Part 1—Introduction to RDMA"; Education and Sample Code for RDMA Programming; Powered by WordPress.com; Posted on Oct. 8, 2010; pp. 1-6.
International Search Report—PCT, International Application No. PCT/CN2014/082597, International Filing Date: Jul. 21, 2014, International Business Machines Corporation.
International Preliminary Report on International Application No. PCT/CN2014/082597 dated Jan. 26, 2016, 1 page.
Written Opinion on International Application No. PCT/CN2014/082597 dated Oct. 20, 2014, pp. 1-3.

* cited by examiner

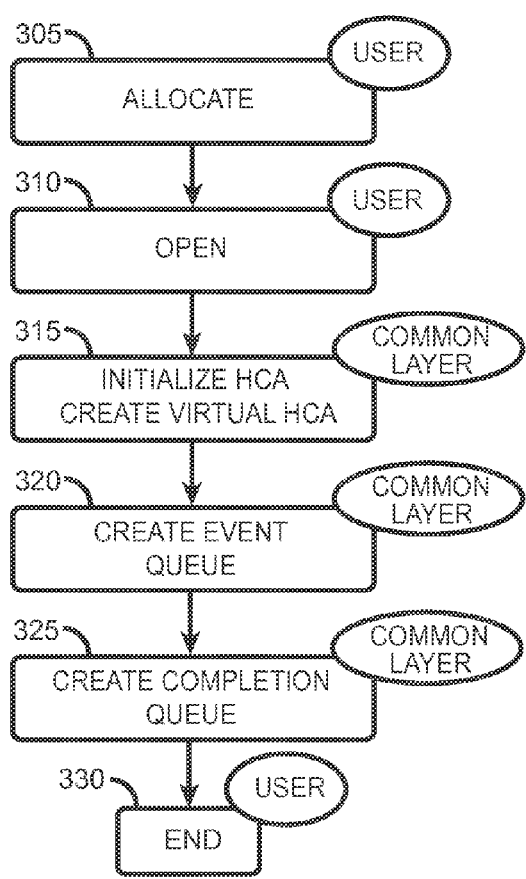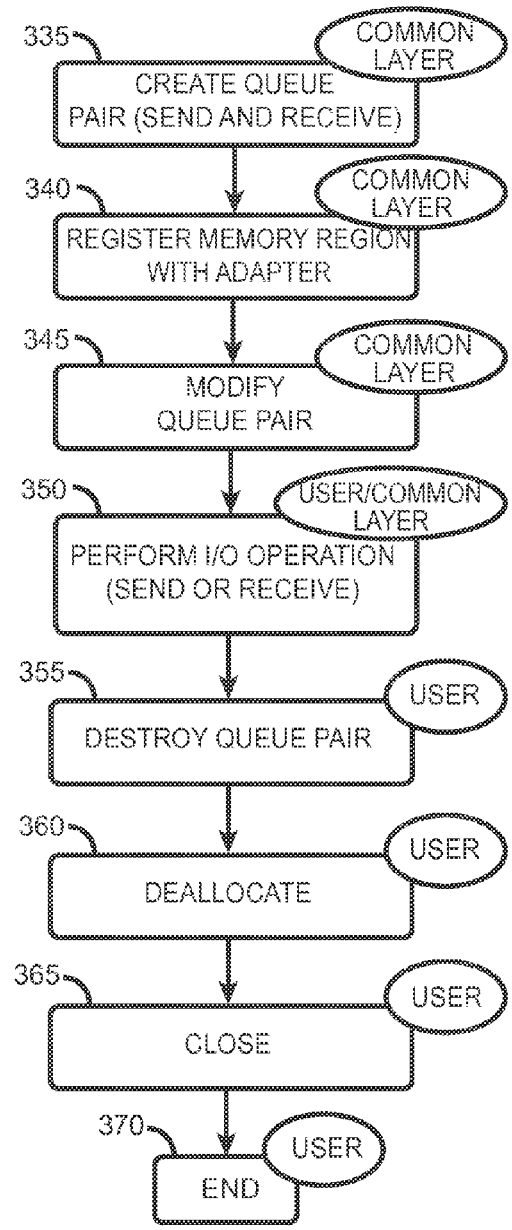

OPERATING SYSTEM VIRTUALIZATION FOR HOST CHANNEL ADAPTERS

CROSS REFERENCE TO RELATED APPLICATIONS

This patent application is a continuation of, and claims priority to, the U.S. Patent Application entitled "Operating System Virtualization for Host Channel Adapters", inventors Jerry W Stevens et al., application Ser. No. 13/948,146, filed Jul. 22, 2013, issued as U.S. Pat. No. 9,128,740, that is assigned to the same Assignee as the subject patent application, the disclosure of which is incorporated herein by reference in its entirety.

BACKGROUND

The disclosures herein relate generally to information handling systems (IHSs), and more specifically, to IHSs that communicate with other particular IHSs. IHSs employ physical adapters to communicate with other IHSs over a network. In multi-user IHSs, the IHS may employ multiple virtual adapters to communicate over a physical adapter with other IHSs to increase resource utilization.

BRIEF SUMMARY

In one embodiment, a method of virtualizing a host channel adapter (HCA) is disclosed that includes partitioning a memory of a host information handling system (IHS) into a plurality of logical partitions (LPARs) including a particular LPAR, the host IHS including a plurality of physical host channel adapters (HCAs). The method also includes providing a single instance of an operating system to the particular LPAR, the single instance of the operating system including a common layer that provides virtualization of the physical HCAs and sharing of the physical HCAs by multiple virtual HCAs.

In another embodiment, a host information handling system (IHS) is disclosed that includes a processor. The host IHS also includes a system memory coupled to the processor, the system memory being partitioned into a plurality of logical partitions (LPARs) including a particular LPAR, the host IHS including a plurality of physical host channel adapters (HCAs). The system memory is configured to provide a single instance of an operating system to the particular LPAR, the single instance of the operating system including a common layer that provides virtualization of the physical HCAs and sharing of the physical HCAs by multiple virtual HCAs In yet another embodiment, a computer program product is disclosed that includes a non-transitory computer readable storage medium. The computer program product also includes first instructions that partition a memory of a host information handling system (IHS) into a plurality of logical partitions (LPARs) including a particular LPAR, the host IHS including a plurality of physical host channel adapters (HCAs). The computer program product further includes second instructions that provide a single instance of an operating system to the particular LPAR, the single instance of the operating system including a common layer that provides virtualization of the physical HCAs and sharing of the physical HCAs by multiple virtual HCAs. The first and second instructions are stored on the non-transitory computer readable storage medium.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 3A is a flowchart of setup processes that the disclosed host IHS may employ.

FIG. 3B is a flowchart of processes that the disclosed host IHS may employ to communicate with a remote IHS.

DETAILED DESCRIPTION

The disclosed network system includes a host information handling system (IHS) that communicates via a network with a remote IHS. The host IHS includes a system memory that a hypervisor partitions into multiple logical partitions (LPARs). The host IHS may include multiple host channel adapters (HCA's) that are real physical adapters. In one embodiment, the HCAs are PCIe based HCAs. A particular LPAR includes a single instance of an operating system and a common layer that provides HCA services. The common layer provides virtualization of the real physical adapters and sharing of a real physical HCA by multiple virtual HCAs by creating and managing multiple virtual HCAs. In one embodiment, the disclosed virtualization methodology is encompassed within the operating system itself. In one embodiment, the common layer does not span multiple LPARs and/or multiple operating systems. The particular LPAR may include multiple users, such as TCP/IP stacks, for example. Each user may access the real physical adapter via a respective virtual adapter. In one embodiment, although each user accesses the real physical adapter via a respective virtual adapter, each user behaves as if it had its own copy of the real physical adapter. The disclosed network system isolates these users from one another.

Figure 1:
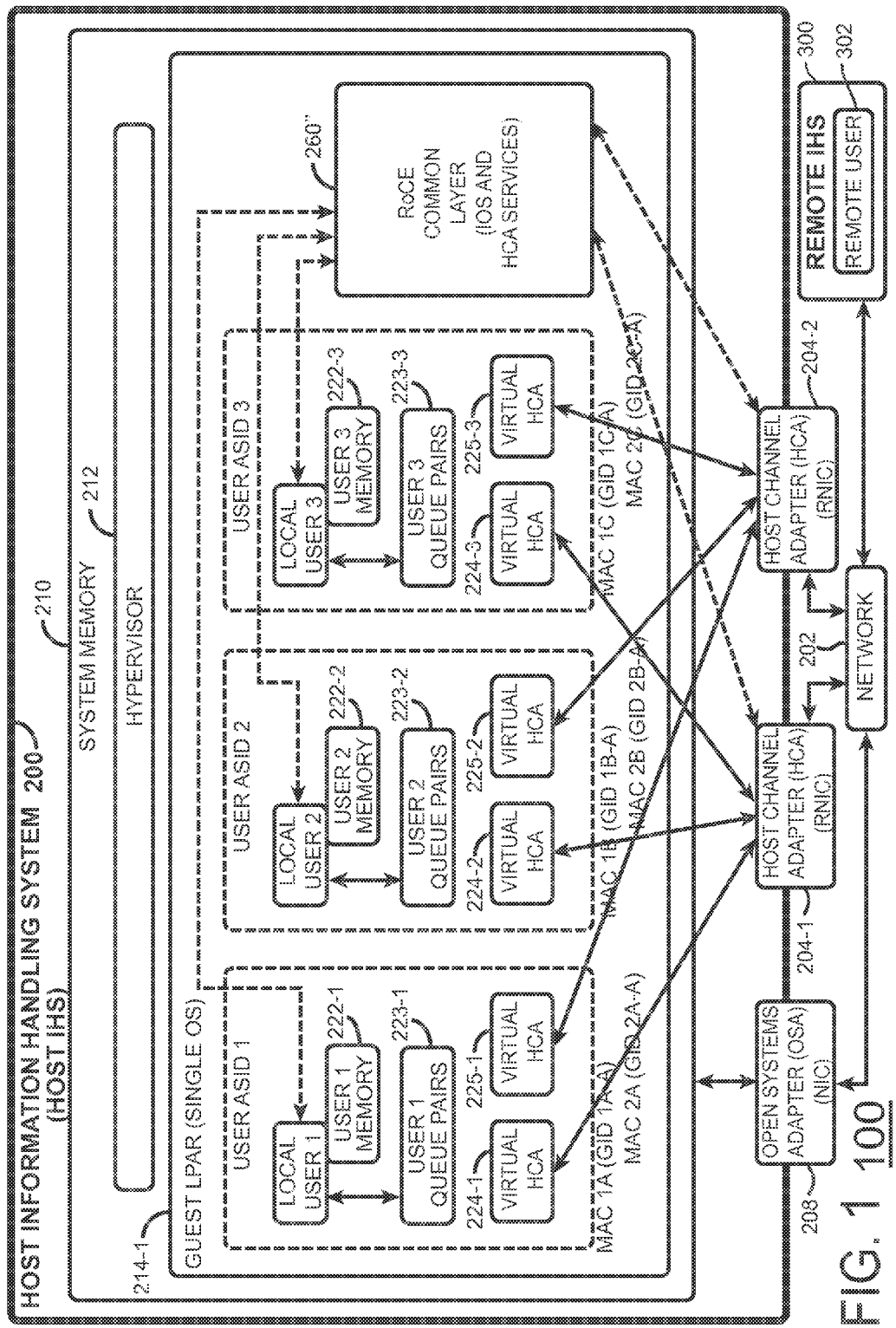
FIG. 1 is a block diagram showing the disclosed network system.

FIG. 1 is a block diagram showing one embodiment of the disclosed network system 100. Network system 100 includes a host IHS 200 that couples to a remote IHS 300 via network 202. Host IHS 200 includes host channel adapters 204-1 and 204-2. Host IHS 200 also includes a network interface controller (NIC) 208 such as an open systems adapter (OSA) card, i.e. OSA 208. OSA 208 is a real physical adapter. Host channel adapters HCA 204-1 and HCA 204-2 are also real physical adapters. However, in one embodiment, HCA 204-1 and HCA 204-2 are RNICs, namely RDMA enabled NICs, wherein RDMA is remote direct memory access, a technology that enables an IHS to exchange information with another IHS without involving the processor, cache or operating system.

Figure 2:
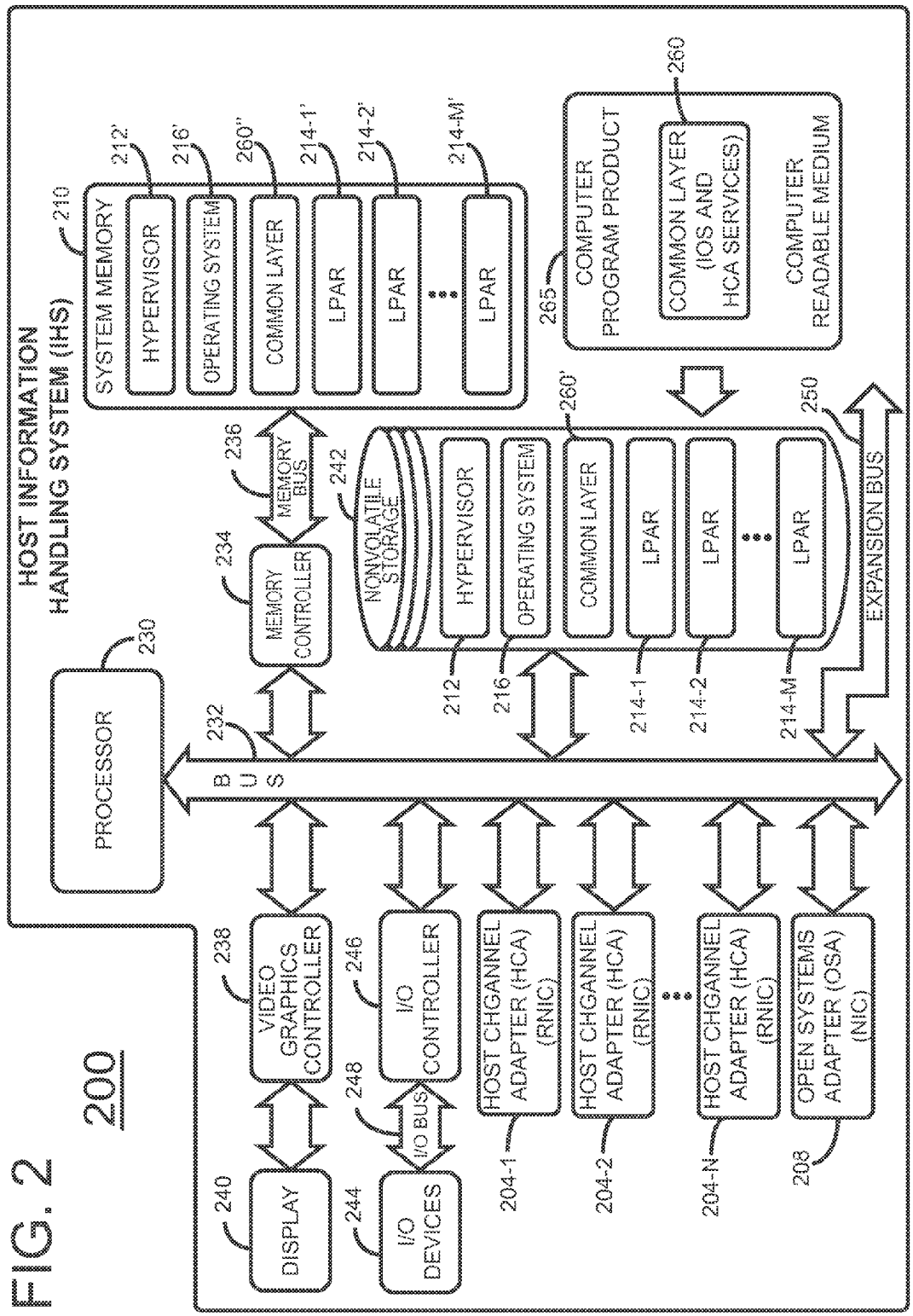
FIG. 2 depicts a host information handling system (IHS) that the disclosed network system may employ.

Host IHS 200 includes a processor (shown in FIG. 2 as processor 230) that couples via a bus (shown in FIG. 2 as bus 232) to a system memory 210. Returning to FIG. 1, system memory 210 stores a hypervisor 212. Hypervisor 212 partitions system memory 210 into multiple LPARs, of which one LPAR is shown as guest LPAR 214-1. LPAR 214-1 includes a single instance of an operating system 216, as shown in FIG. 2. Returning to FIG. 1, LPAR 214-1 includes local user 1, local user 2 and local user 3. Each of the local users may be a respective TCP/IP stack. A unique user process ID (ASID) associates with each local user, respectively. For example, USER ASID 1 associates with local user 1, USER ASID 2 associates with local user 2, and USER ASID 3 associates with local user 3, as shown in FIG. 1. User 1 memory 222-1 associates with local user 1, user 2 memory 222-2 associates with local user 2, and user 3 memory 222-3 associates with local user 3. User 1 queue pairs 223-1 couple to, and communicate with, local user 1. In a similar manner, user 2 queue pairs 223-2 couple to, and communicate with, local user 2. Likewise, user 3 queue pairs 223-3 couple to, and communicate with, local user 3, all as shown in FIG. 1.

In the embodiment of FIG. 1, host IHS 200 creates virtual HCAs 224-1 and 225-1 for use by local user 1 to access HCA 204-1 and 204-2, respectively. Host IHS also 200 creates virtual HCAs 224-2 and 225-2 for use by local user 2 to access HCA 204-1 and 204-2, respectively. Host IHS 200 further creates virtual HCAs 224-3 and 225-3 for use by local user 3 to access HCA 204-1 and 204-2, respectively.

Remote IHS 300 of network system 100 includes a remote user 302 that may be a TCP IP stack, in one embodiment. Local users 1, 2 and 3 of LPAR 214-1 may communicate with remote user 302 as a peer via a respective virtual HCA and physical HCA such as HCA 204-1 or 204-2. For example, local user 1 may communicate with remote user 302 using an RDMA read or RDMA write operation via virtual HCA 224-1 and host channel adapter 204-1.

LPAR 214-1 includes an HCA services common layer 260" that provides I/O supervisor (IOS) and HCA services. In one embodiment, HCA services common layer 260" is an RDMA over Converged Ethernet (RoCE) common layer that provides virtualization services to a user such as local user 1. HCA services common layer 260" includes a common set of services that provide a basic set of control services that interact with a physical adapter, such as HCA 204-1, for basic related control operations, such as opening and allocating the physical adapter. Layer 260" effectively creates one or more virtual adapters, such as virtual HCA 224-1, that may communicate with remote user 302 via network 202 using RDMA operations. In one embodiment, the physical adapter is only aware of a single instance of a dedicated user, namely the control function that the operating system provides.

More particularly, as each local user such as a TCP/IP stack attempts to access a physical adapter such as HCA 204-1 by transmitting a request, HCA services common layer 260" intercepts the request and creates a virtual instance of the HCA such as virtual HCA 224-1 for each local user. On behalf of each virtual HCA instance, a control function of HCA services common layer 260" creates a unique virtual MAC and Global ID (GID) for each local user (i.e. TCP/IP stack) that activates the physical adapter. Each user, i.e. each TCP/IP stack, registers memory to the physical adapter to be associated with a unique user process ID, such as USER ASID 1, for example. This enables each stack (ASID) to be associated with each unique virtual instance of a physical adapter. The MACs and GIDs of FIG. 1 show that each local user (TCP stack) exhibits a unique virtual MAC (VMAC) and GID associated with each virtual HCA that corresponds to each physical adapter. The VMACs and GIDs provide external addressability to each user on the external network 202 (i.e. packets destined to a specific VMAC will be routed to the specific user of that VMAC). The GID represents the user of a given VMAC In one embodiment, for each virtual instance of a physical adapter, HCA services common layer 260" creates a virtual device driver layer that allows each device driver to independently operate (start and stop) the virtual instance of the physical adapter. Layer 260" further provides each local user, i.e. TCP/IP stack, with a unique set of adapter-related resources such as completion queues (CQs) and queue pairs, as discussed in more detail with reference to the flowchart of FIG. 3. In one embodiment, all host user memory, both virtual and real, is isolated to each virtual instance of the physical adapter and its underlying user process. In one embodiment, an operating system processing priority controller such as a workload manager (not shown) may provide fairness for each independent local user's consumption of physical adapter resources In another embodiment, all remote users such as remote user 302 may view each independent local user such as local user 1 as a separate HCA (virtual MAC) and user (GID) of the physical adapter. Host IHS 200 isolates memory regions and access to memory 210 for each virtual HCA. In one embodiment, LPAR 214-1 is configured such that virtual HCA and stack (local user process) termination scenarios, both normal and abnormal, are isolated to the virtual resources associated with each local user, i.e. stack. When a physical adapter such as HCA 204-1 terminates, in one embodiment, HCA services common layer 260" terminates all virtual instances of HCA's corresponding to that physical adapter In one embodiment there is a common interface between local user 1, local user 2, local user 3 and common layer 260", as indicated by the dashed lines between these components. Each local user (such as local user 1) has an interface to invoke the common service layer 260" and the common service layer 260" either intercepts those calls, or redirects those calls to an HCA or provides services to manage the virtual HCAs.

FIG. 2 is a block diagram of a host information handling system (IHS) that may be used as host IHS 200 in the disclosed network system. Host IHS 200 includes a processor 230 that may include multiple cores. Host IHS 200 processes, transfers, communicates, modifies, stores or otherwise handles information in digital form, analog form or other form. Host IHS 200 includes a bus 232 that couples processor 230 to system memory 210 via a memory controller 234 and memory bus 236. System memory 210 also be referred to as main memory. System memory 210 be a static random access memory (SRAM) array or a dynamic random access memory (DRAM) array. Processor 230 may also include local memory such as L1, L2 and L3 caches. A video graphics controller 238 couples display 240 to bus 232. Nonvolatile storage 242, such as a hard disk drive, solid-state drive (SSD), CD drive, DVD drive, or other nonvolatile storage couples to bus 232 provide host IHS 200 with permanent storage of information. System memory 210 and nonvolatile storage 242 are both forms of memory stores. Nonvolatile storage 242 stores an operating system 216 that governs operation of host IHS 200. I/O devices 244, such as speakers, a keyboard and a pointing device, couple to bus 232 via I/O controller 246 and I/O bus 248.

One or more expansion busses 250, such as USB, IEEE 1394 bus, ATA, SATA, PCI, PCIE, DVI, HDMI and other busses, couple to bus 232 to facilitate the connection of peripherals and devices to host IHS 200. Host IHS 200 of FIG. 2 includes many components in common with host IHS 200 of FIG. 1. Like numbers indicate like components when comparing host IHS 200 of FIG. 2 with host IHS 200 of FIG. 1. For example, host IHS 200 includes host channel adapters (HCAs) 204-1, 204-2, . . . 204-N, wherein N is the total number of HCAs in host IHS 200. Nonvolatile storage 242 includes LPARs 214-1, 214-2 . . . 214-M, wherein M is the total number of LPARs in host IHS 200.

While FIG. 2 shows one host IHS that employs processor 230, the host IHS may take many forms. For example, host IHS 200 may take the form of a desktop, portable, laptop, notebook, tablet or other form factor computer or data processing system. HCM IHS 500 may take other form factors such as a gaming device, a personal digital assistant (PDA), a portable telephone device, a communication device or other devices that include a processor and memory.

Host IHS 200 includes an HCA services common layer program product 260 on digital media 265 such as a CD, DVD or other media. For simplicity, the term common layer will be used below. Host IHS 200 may store common layer 260 in nonvolatile storage 242 as common layer 260'. When host IHS 200 initializes, the IHS loads operating system 216 into system memory 210 for execution as operating system 216'. Host IHS 200 also loads common layer 260' into system memory 210 for execution as common layer 260", respectively. In actual practice, common layer 260 maybe part of operating system 216. Host IHS 200 also loads LPARs 214-1, 214-2, . . . 214-M into system memory 210 for use as LPARs 214-1', 214-2', . . . 214-M'.

FIGS. 3A and 3B are flow charts that depict process flow in one embodiment of network system 100. The flowchart of FIG. 3A shows a representative process flow for setting up a virtual instance of a physical adapter. Process flow commences with a local user such as local user 1 requesting an "allocate" operation, as per block 305. This allocate operation allocates a physical function identifier (PFID) such that local user 1 essentially claims the use of a physical adapter such as HCA 204-1. A local user such as local user 1 requests an "open" operation to establish a virtual environment for use by this particular local user, as per block 310. This step repeats for each individual user. This request, i.e. command, establishes a relationship between the individual user and a respective virtual HCA. The "open" command is a command that ties a particular local user, such as local user 1, to a particular virtual HCA, such as virtual HCA 224-1

The common layer 260" conducts an "initialize HCA" operation that initializes the virtual HCA environment, as per block 315. In one embodiment, this step represents the interaction with host hardware and a PCI interface to initialize the virtual HCA environment. Common layer 260" creates an event queue (EQ) (not shown) in LPAR 214-1, as per block 320. The event queue represents interrupts or work events that a particular virtual HCA will post to a corresponding respective local user. Common layer 260" creates a completion queue (CQ), as per block 325. It is noted that the "initialize HCA" operation of block 315 and the "create event queue" operation of block 320 are one-time events regardless of the number of users. However, the "create completion queue" operation of block 325 is performed on a per user basis, and thus may be performed multiple times according to the number of users seeking to use HCA adapters. In this manner, common layer 260 creates a virtual environment by setting up a virtual HCA and/or multiple virtual HCAs for use. Process flow in the flowchart of FIG. 3A ends at and block 330.

After creating the virtual environment in FIG. 3A, process flow continues to the process steps of FIG. 3B. Common layer 260" performs a "create queue pair" operation, as per block 335. This queue pair (not shown) in LPAR 214-1 ties to a particular user's structures. The queue pair represents a connection between a particular local user such as local user 1 and a remote user such as remote user 302. Once common layer 260" creates a queue pair between a local user and a remote user, other users may not access the virtual HCA dedicated to this particular queue pair. Common layer 260" dedicates a respective completion queue to each local user attempting to access a physical adapter. Common layer 260" creates queue pairs dynamically as needed to enable local users such as local user 1 to communicate with a respective remote user such as remote user 302.

To review, each time common layer 260" receives a connection request, common layer 260" creates a queue pair if a queue pair does not already exist for a particular remote peer such as remote user 302. After creating the queue pair, common layer 260" registers a memory region with the virtual HCA, as per block 340. In one embodiment, this memory registration process will assign an RKey and Protection Domain to the just registered memory. The common IOS (I/O services) of the common layer will also provide memory translation services to pin the memory and record the physical address of the memory. The RKey information is shared with the peer via out-of-band flows. Common layer 260" performs a "modify queue pair" operation, as per block 345. In this manner, common layer 260" associates the queue pair of the local user, such as local user 1, with the queue pair of a remote peer, such as remote user 302. The modify queue pair (QP) operation will also transition the QP to ready to send and ready to receive in preparation for I/O operations with the remote peer.

With the virtual environment now completely set up and configured, the local user in cooperation with common layer 260" performs RDMA I/O operation, such as an RDMA read (receive) or an RDMA write (send) or PCIe Post (RDMA Write work request) or Poll (receive RMDA work request), as per block 350. As workloads grow and contract, additional memory regions (MRs) can be dynamically added (created) or removed (destroyed) from the QP.

To terminate the connection to remote user 302, a local user such as local user 1 issues a destroy queue pair command, as per block 355. The local user issues a "deallocate" command, as per block 360 and a "close" command as per block 365 to terminate the connection. Process flow ends at end block 370.

The disclosed operating system HCA virtualization methodology provides adapter sharing, isolation (security) and independent operation (configuration, management and control) with reduced overhead and complexity.

As will be appreciated by one skilled in the art, aspects of the disclosed methodology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the FIGS. 3A-3B flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart of FIGS. 3A-3B and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart of FIGS. 3A-3B described above.

The flowchart of FIGS. 3A-3B illustrate the architecture, functionality, and operation of possible implementations of systems, methods and computer program products that perform analysis in accordance with various embodiments of the present invention. In this regard, each block in the flowcharts of FIGS. 7 and 8 may represent a module, segment, or portion of code, which comprises one or more executable instructions for implementing the specified logical function(s). It should also be noted that, in some alternative implementations, the functions noted in the block may occur out of the order noted in FIGS. 3A-3B. For example, two blocks shown in succession may, in fact, be executed substantially concurrently, or the blocks may sometimes be executed in the reverse order, depending upon the functionality involved. It will also be noted that each block of FIGS. 3A-3B and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    partitioning a memory of a host information handling system (IHS) into a plurality of logical partitions (LPARs) including a particular LPAR, the host IHS including a plurality of physical host channel adapters (HCAs); and
    providing a single instance of an operating system to the particular LPAR, the single instance of the operating system including a common layer that provides virtualization of the physical HCAs and sharing of the physical HCAs by multiple virtual HCAs.

2. The method of claim 1, wherein multiple virtual HCAs share a particular physical HCA.

3. The method of claim 1, further comprising:
    generating a request, by a user of the particular LPAR, for a physical HCA;
    intercepting the request by the common layer; and
    forwarding the request, by the common layer, to a virtual HCA that is isolated from other users of the particular LPAR.

4. The method of claim 3, wherein the user of the particular LPAR is a TCP/IP stack.

5. The method of claim 1, wherein the common layer provides host channel adapter services.

6. The method of claim 1, wherein the common layer is an RDMA over Converged Ethernet (RoCE) layer.

7. The method of claim 1, further comprising providing a respective virtual MAC address and global identifier (GID) to each user for each physical HCA of the single logical partition.

* * * * *